US012703075B2

(12) United States Patent
Hu et al.

(10) Patent No.: US 12,703,075 B2
(45) Date of Patent: Aug. 11, 2026

(54) VIBRATION DAMPING STRUCTURE FOR POWER TOOL AND POWER TOOL WITH VIBRATION DAMPING STRUCTURE

(71) Applicant: MILWAUKEE ELECTRIC TOOL CORPORATION, Brookfield, WI (US)

(72) Inventors: Guang Hu, Dongguan City (CN); Liang Jian Huang, Dongguan City (CN); Wei Liang, Dongguan City (CN); Feng Kun Lu, Dongguan City (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/885,109

(22) Filed: Sep. 13, 2024

(65) Prior Publication Data

US 2025/0091189 A1 Mar. 20, 2025

(30) Foreign Application Priority Data

Sep. 14, 2023 (CN) ......................... 202322498536.8

(51) Int. Cl.
*B25F 5/00* (2006.01)
*B25B 21/02* (2006.01)

(52) U.S. Cl.
CPC .............. *B25F 5/006* (2013.01); *B25B 21/02* (2013.01)

(58) Field of Classification Search
CPC ....... B25F 5/006; B25B 21/02; B25B 23/021; B25B 23/0042; B25B 23/16
See application file for complete search history.

(56) References Cited

U.S. PATENT DOCUMENTS

| | | | | |
|---|---|---|---|---|
| 10,232,500 | B2 * | 3/2019 | Lindell | F16F 7/116 |
| 11,318,589 | B2 | 5/2022 | Schneider et al. | |
| 11,739,481 | B2 * | 8/2023 | Borgers | B25D 9/265 173/117 |
| 2010/0149790 | A1 * | 6/2010 | Leong | B25F 5/021 362/119 |
| 2015/0209927 | A1 * | 7/2015 | DeLand | B23Q 5/08 408/1 R |
| 2021/0331128 | A1 | 10/2021 | Carlson et al. | |
| 2022/0104432 | A1 * | 4/2022 | Castellari | B25F 5/006 |
| 2022/0152808 | A1 * | 5/2022 | Ferrari | A01D 34/905 |

(Continued)

FOREIGN PATENT DOCUMENTS

| | | | |
|---|---|---|---|
| EP | 4056325 | A1 | 9/2022 |
| GB | 2429257 | A | 2/2007 |
| WO | 2019074424 | A1 | 4/2019 |

OTHER PUBLICATIONS

Extended European Search Report for Application No. 24200395.2 dated Feb. 3, 2025 (10 pages).

(Continued)

*Primary Examiner* — Michelle Lopez
(74) *Attorney, Agent, or Firm* — Michael Best & Friedrich LLP

(57) ABSTRACT

A power tool includes a working portion with a motor housing enclosing a motor, a handle portion including a handle housing, a connecting member having a first end coupled to the handle housing and a second end coupled to the motor housing, and a vibration damping structure configured to reduce transmission of vibration from the motor housing to the handle housing.

19 Claims, 10 Drawing Sheets

(56) References Cited

U.S. PATENT DOCUMENTS

| | | | | |
|---|---|---|---|---|
| 2023/0121902 | A1 | 4/2023 | Nakashima | |
| 2023/0241752 | A1* | 8/2023 | Maegawa ............ | B25D 17/043<br>173/162.1 |
| 2024/0308034 | A1 | 9/2024 | Kamiya et al. | |

OTHER PUBLICATIONS

Makita, "Extension handle set (191G67-2)," <https://www.makita.co.nz/accessories/item/fastening-833> available as of Sep. 1, 2023 (1 page).

Linkage, "Contents of Lithium battery products," see especially pp. 4-6 for "Vertical dual lithium battery torque wrench AJL-LDB1901," <http://www.linkagecn.com/down/upload/20230213/1676265213.pdf> dated Feb. 13, 2023 (18 pages).

Durofix, "Li-Ion 20V Brushless High Torque Railway Impact Wrench," <https://www.durofix.com.tw/products/productdetial?id=48613893> available as of Sep. 1, 2023 (2 pages).

Prosup, "CRCC DLB-1200 Lithium-Ion Impact Bolt Wrench," <https://prosup.mn/product/crcc-dlb-1200-lithium-ion-impact-bolt-wrench/> available as of Sep. 1, 2023 (3 pages).

Robel Group, "ROMPACT 30.20 $E^3$ cordless impact wrench," <https://robel.com/en/product/rompact-b-akku-schlagschraubmaschine/>AJL- LDB1901> web page accessed Sep. 25, 2024 (2 pages).

* cited by examiner

VIBRATION DAMPING STRUCTURE FOR POWER TOOL AND POWER TOOL WITH VIBRATION DAMPING STRUCTURE

CROSS-REFERENCE TO RELATED APPLICATIONS

This application claims priority to Chinese Utility Model Application No. 202322498536.8, filed on Sep. 14, 2023, the entire content of which is incorporated herein by reference.

FIELD

The present disclosure relates to the field of power tools, and particularly to an electric impact tool.

BACKGROUND

Some power tools include a member intermittently applying an impact force/torque, which inevitably causes vibration. As an example, an electric impact tool comprises a hammer that translates and/or rotates to impact an anvil to provide an impact rotational force or intermittently apply a torque to a workpiece (e.g., a fastener) to tighten or loosen the fastener. As another example, an electric impact wrench may be used to perform processing of a rail, e.g., tightening and loosening bolts on the rail. A high torque impact wrench is capable of transmitting a very large amount of torque to the fasteners. During operation, the impact wrench generates vibration, which may spread over the whole wrench and be transmitted to the operator, and which for example makes the operator's hands tremble so that the operator cannot work for a long time, thereby causing poor use experience to the operator; moreover, these vibrations and impacts can damage the connections between components of the tool, e.g., loosen the connections between the components, or even damage the components themselves.

SUMMARY

Therefore, it is desirable to provide a vibration damping structure suitable for the above-described power tool and a power tool with the vibration damping structure, to avoid the loosening of components caused by the vibrations, and to give a user a better experience, etc.

The present disclosure provides an improved power tool, which is provided with a vibration damping structure to avoid the loosening of components caused by vibration, thereby giving the user a better experience, etc.

For example, in some aspects, the techniques described herein relate to a power tool including: a working portion including a motor housing enclosing a motor; a handle portion including a handle housing; a connecting member having a first end coupled to the handle housing and a second end coupled to the motor housing; and a vibration damping structure configured to reduce transmission of vibration from the motor housing to the handle housing.

In some aspects, the techniques described herein relate to a power tool, wherein the first end of the connecting member extends into the handle housing, and wherein the second end of the connecting member extends into the motor housing.

In some aspects, the techniques described herein relate to a power tool, wherein the vibration damping structure includes a first vibration damping element disposed between the first end of the connecting member and the handle housing, and a second vibration damping element disposed between the second end of the connecting member and the motor housing.

In some aspects, the techniques described herein relate to a power tool, wherein the second vibration damping element has the same shape as the first vibration damping element.

In some aspects, the techniques described herein relate to a power tool, wherein the first vibration damping element and the second vibration damping element are cylindrical.

In some aspects, the techniques described herein relate to a power tool, wherein the first end of the connecting member includes a first through hole, wherein the second end of the connecting member includes a second through hole, wherein the first through hole receives a first fastener to couple the first end of the connecting member to the handle housing, and wherein the second through hole receives a second fastener to couple the second end of the connecting member to the motor housing.

In some aspects, the techniques described herein relate to a power tool, wherein the second vibration damping element includes a connecting through hole aligned with the second through hole.

In some aspects, the techniques described herein relate to a power tool, wherein one end of the second vibration damping element is provided with an annular rim extending radially inwards from an outer circumference of the second vibration damping element.

In some aspects, the techniques described herein relate to a power tool, wherein the one end of the second vibration damping element is provided with a circumferential protruding wall extending from an inner circumference of the annular rim in a length direction of the second vibration damping element toward an interior of the second vibration damping element, and wherein an annular space is formed between the circumferential protruding wall and an inner circumferential wall of the second vibration damping element, and wherein the second end of the connecting member is inserted into the annular space.

In some aspects, the techniques described herein relate to a power tool, further including a carrying handle coupled to the connecting member and located between the handle housing and the motor housing.

In some aspects, the techniques described herein relate to a power tool, further including a third vibration damping element provided between an end of the carrying handle and the connecting member.

In some aspects, the techniques described herein relate to a power tool, wherein the first vibration damping element, the second vibration damping element, and the third vibration damping element are made of an elastic material.

In some aspects, the techniques described herein relate to a power tool, further including a lighting device is disposed in a recess at a front end of the working portion; and/or wherein the working portion includes a drive assembly including a camshaft configured to receive torque from the motor, a camshaft, an anvil, and a hammer is movable along the camshaft to deliver periodic rotational impacts to the anvil.

In some aspects, the techniques described herein relate to a power tool, further including a battery pack removably coupled to the handle portion; and/or wherein the handle portion includes two gripping portions extending in opposite directions such that the handle portion is generally T-shaped to facilitate use and operation of the power tool by two hands.

In some aspects, the techniques described herein relate to a power tool, further including a battery receptacle disposed on a side of the handle housing and configured to receive the battery pack such that the battery pack is offset from a central longitudinal axis of the power tool; and, optionally, wherein the battery pack is slidably coupled to the battery receptacle along a battery axis parallel to the central longitudinal axis.

In some aspects, the techniques described herein relate to a power tool including: a working portion including a motor housing enclosing a motor, a gearbox coupled to the motor housing, and a drive assembly including an anvil extending from the gearbox; a handle portion including a handle housing, two gripping portions extending in opposite directions such that the handle portion is generally T-shaped, and a battery receptacle disposed on a side of the handle housing; an elongated connecting member extending along a central longitudinal axis and having a first end coupled to the handle housing and a second end coupled to the motor housing; and a battery pack slidably coupled to the battery receptacle along a battery axis parallel to the central longitudinal axis.

In some aspects, the techniques described herein relate to a power tool, further including first vibration damping element provided between the handle housing and the first end of the elongated connecting member and a second vibration damping element provided between the motor housing and the second end of the elongated connecting member.

In some aspects, the techniques described herein relate to a power tool including: a working portion including a motor housing enclosing a motor, a gearbox coupled to the motor housing, and a drive assembly including an anvil extending from the gearbox; a handle portion including a handle housing, two gripping portions extending in opposite directions such that the handle portion is generally T-shaped, and a battery receptacle disposed on a side of the handle housing; a connecting member having a first end coupled to the handle housing and a second end coupled to the motor housing; and a vibration damping structure configured to reduce transmission of vibration from the working portion to the handle portion.

In some aspects, the techniques described herein relate to a power tool, wherein the vibration damping structure includes a plurality of elastic vibration damping elements.

In some aspects, the techniques described herein relate to a power tool, further including a battery pack removably coupled to the handle portion.

According to the power tool of the present disclosure, by providing the vibration damping elements between the handle housing, the motor housing and the carrying handle and the connecting member of the power tool, the connection strength between them may be increased, the vibration may be dampened, the damages caused by the vibration to the components of the power tool itself may be greatly reduced, and the loosening of the connection between the components caused by the vibration may be reduced.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

The present disclosure relates to a power tool 100, comprising a member continuously or intermittently applying a force/a torque (i.e., a working portion or a vibration source portion), a handle portion and a connecting member connected between the working portion and the handle portion, wherein the vibration generated by the working portion is transmitted throughout the working portion and to the handle portion through the connecting member. The concept of the present disclosure is described herein by taking an electric impact tool (such as an impact wrench) and the like as an example, but is not limited thereto. The power tool may also be other types of power tools known or common in the art, such as a drilling machine, a hammer drill, an impact drill, an angle grinder, a vibration polisher and the like, and accordingly, the inventive concept herein of the present disclosure is also applicable to these power tools.

Figure 1A:
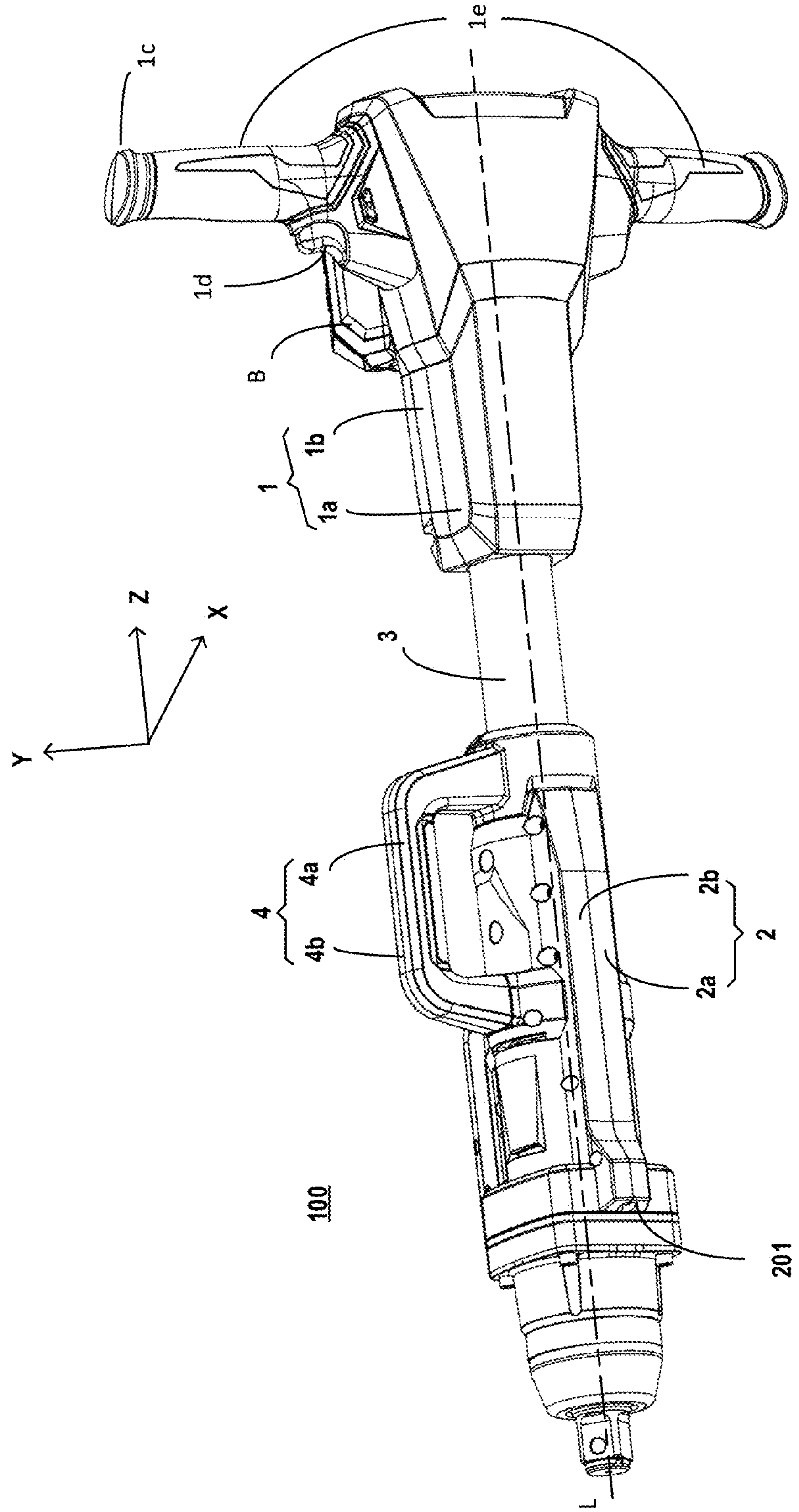
FIG. 1A is a perspective view of an exemplary power tool according to the present disclosure.

FIG. 1A is a perspective view of a power tool 100 according to the present disclosure. The power tool 100 may be an elongated high torque impact wrench comprising a handle portion including a handle housing 1, a working portion including a motor housing 2, and a connecting member 3 which may be, for example, a connecting tube, connected between the handle housing 1 and the motor housing 2. The handle housing 1 is provided with a handle 1*c* for an operator to hold to work and an actuator 1*d* (such as a trigger) to trigger the operation of the power tool 100. In the illustrated embodiment, the handle 1*c* comprises two gripping portions 1*e* extending in opposite directions such that the handle 1*c* is generally T-shaped to facilitate use and operation of the power tool 100 by two hands.

In an operational application, such as an application of the power tool 100 to fasten a rail for a maintenance purpose, the power tool 100 is vertically oriented, i.e., the handle housing 1 is located in an upper portion and the motor housing 2 is located in a lower portion. Therefore, in this case, the handle housing 1 may be referred to as a top housing and the motor housing 2 may be referred to as a bottom housing. The illustrated power tool 100 is configured such that a user may perform a fastening operation on a rail extending along the ground while remaining in an upright, standing position.

Figure 1B:
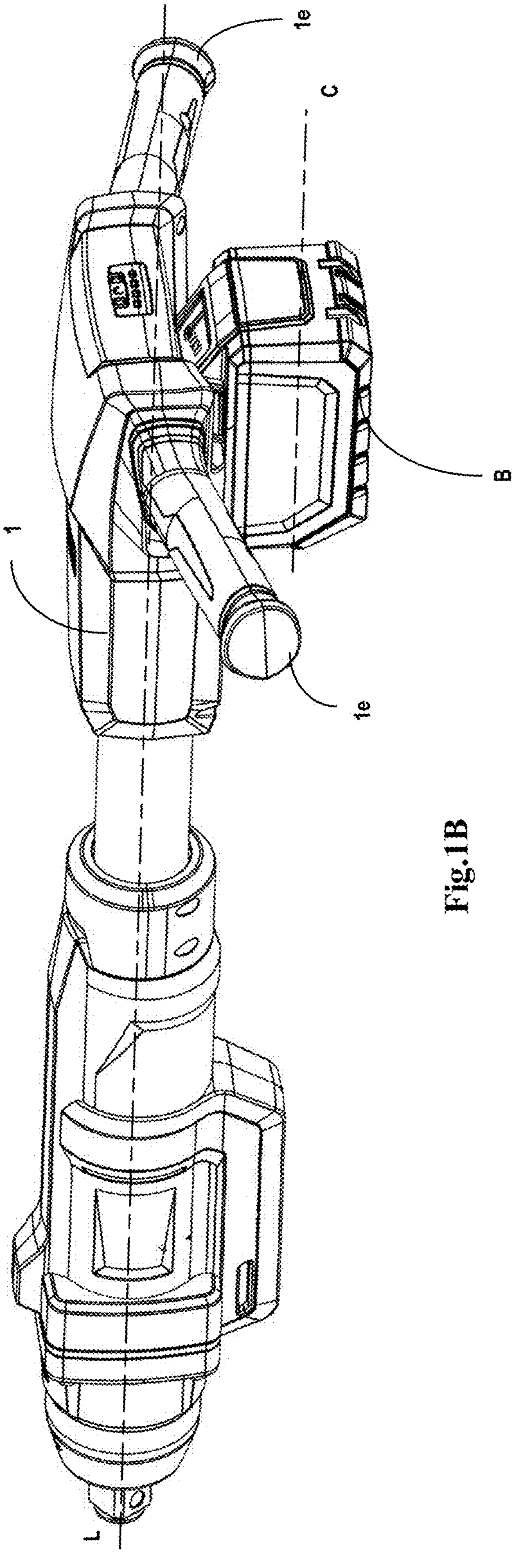
FIG. 1B shows an arrangement of a battery pack in the power tool.

Referring to FIG. 1A and FIG. 1B, a central longitudinal axis L of the power tool 100 extends through the handle housing 1, the connecting member 3 and the motor housing 2. A rear side of the handle housing 1 is provided with a battery pack B to power the power tool 100. The battery pack B is removably connected to a battery receptacle on a rear side of the handle housing 1. As such, the battery pack B may usually face the user during operation of the power tool 100, so that the battery pack B may be protected from impacts when the power tool 100 accidentally falls down and away from the user. 1 may be a rechargeable power tool battery pack having a nominal output voltage of 18 volts. The illustrated battery pack B is slidably coupled to the battery receptacle of the handle housing 1 along a battery pack axis C parallel to the central longitudinal axis L. In the illustrated embodiment, the central longitudinal axis L does not intersect the battery pack B. By offsetting the battery pack B from the central longitudinal axis L, the moment of inertia of the handle housing 1 is increased so that the handle housing 1 is more stable during operation of the power tool 100. However, in other embodiments, the battery receptacle and battery pack B may be located elsewhere on the power tool 100, such as on the motor housing 2.

Figure 1C:
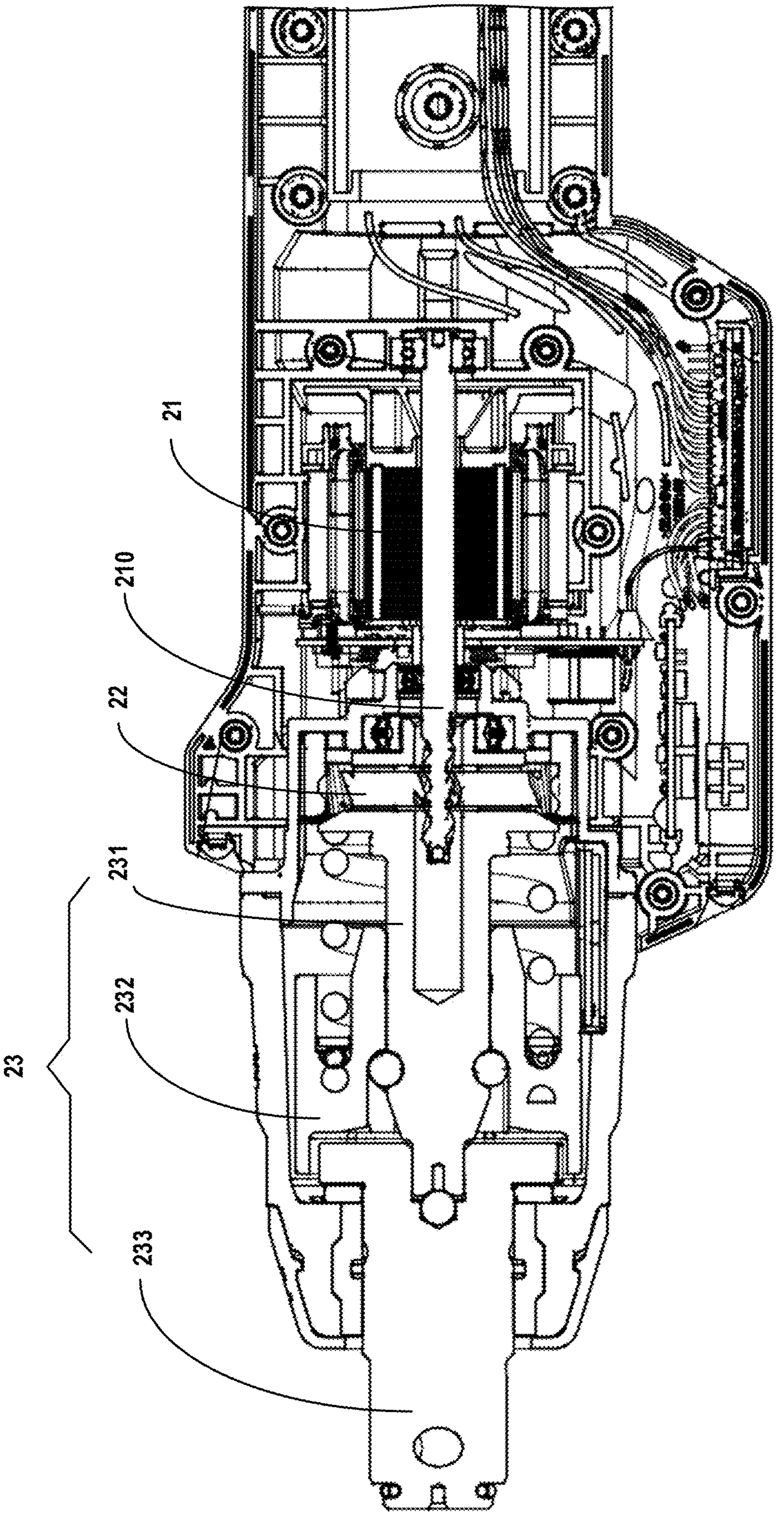
FIG. 1C shows a motor, a gear assembly, and a drive assembly of the power tool in a partial cross-sectional view.
Figure 2:
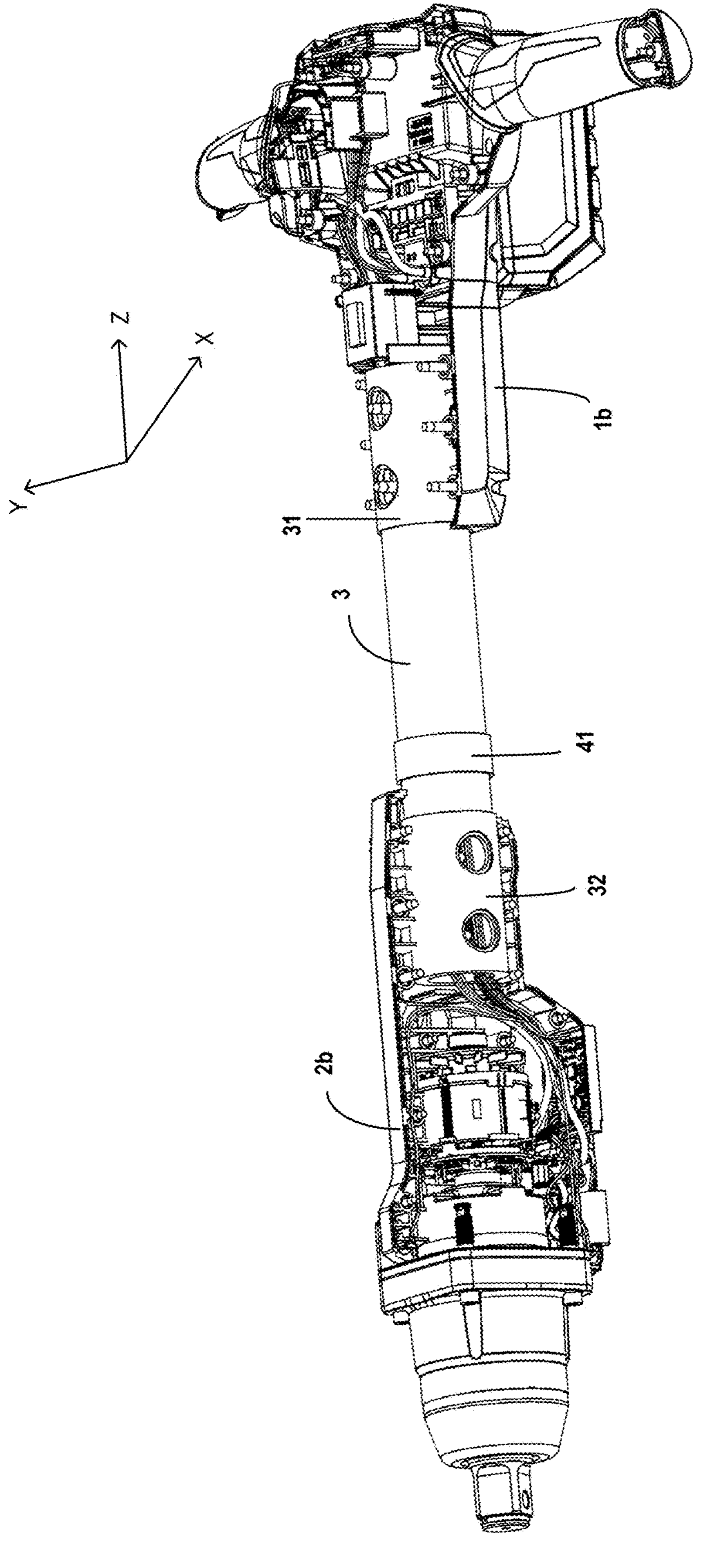
FIG. 2 is a perspective view of an exemplary power tool according to the present disclosure with a portion of a handle housing, a portion of a motor housing, and a carrying handle removed to expose a vibration damping structure.

Referring to FIG. 1C and FIG. 2, a motor 21 is provided in a motor housing 2, an output shaft 210 of the motor 21 is connected to a gear assembly 22 (e.g., a planetary gear set), and an output of the gear assembly 22 is connected to a drive assembly 23 (or an impact mechanism). In the illustrated embodiment, the motor 21, the gear assembly, and the drive assembly 23 are supported by the working portion of the power tool 100. The drive assembly 23 may include a camshaft 231, a hammer 232 and an anvil 233. The hammer 232 is supported on the camshaft 231 and is coupled to the camshaft 231 via cam balls and cam grooves, such that the hammer 232 is able to move axially along the camshaft 231 against the biasing force of a hammer spring (e.g., a coil spring) in response to relative rotation between the hammer 232 and the camshaft 231. The energy stored in the hammer spring may then be released to propel the hammer 232 forward along the camshaft 231, resulting in rotation of the hammer 232, until the hammer 232 delivers a rotational impact to the anvil 233. The gear assembly 22 and the drive assembly 23 may be at least partially disposed in a gearbox connected in front of the motor housing 2, and the gearbox and the motor housing 2 may together form a working portion.

The anvil 233 extends from the gearbox. A working element, such as a socket, may be connected to an anvil 233 for working on a workpiece, such as a fastener. In operation, the motor 21 and gear assembly 22 provide a rotational force (e.g., a continuous torque) to the drive assembly 23, whereby the hammer 232 translates and/or rotates to deliver an impact rotational force (e.g., periodic applications of torque/rotational impacts) to the anvil 233. In this process, the drive assembly 23 generates vibrations which, as described in detail below, are damped by the vibration damping element. As such, transmission of these vibrations from the motor housing 2 to the connecting member 3, to the handle housing 1, and further to the hands of the operator who holds the handle, is reduced.

Referring to FIG. 1A and FIG. 2, for case of reference, illustration and description, an XYZ coordinate system is depicted in which a longitudinal extension or axis of the tool is defined as a Z-axis, an extension direction of a pair of handles of the handle housing 1 is defined as a Y-axis, and a direction orthogonal to the Y-axis- and Z-axis is defined as an X-axis. The handle housing 1 is assembled from two housing halves, namely, a first handle housing half 1*a* and a second handle housing half 1*b*, which are assembled together or disassembled from each other along the X-axis, and which are first aligned with each other when mounted and then connected to each other using fasteners, such as bolts. Similarly, the motor housing 2 is assembled from two housing halves, i.e., a first motor housing half 2*a* and a second motor housing half 2*b*, which are assembled together or disassembled from each other along the Y-axis, and which are first aligned with each other when mounted and then connected to each other using fasteners, such as bolts. The handle housing 1 and the motor housing 2 are assembled from two housing halves for case of manufacture and assembling, they may be made of plastic by an injection molding process and detachably assembled by a common mechanical attachment method such as fasteners. The detachable assembling facilitates quick opening of the housing for replacement or repair of parts inside the housing during later maintenance of the tool. Although the figures show that the handle housing 1 and the motor housing 2 are divided into two halves in different directions X and Y, respectively, this is only an example and they may be divided into two halves in the same direction.

Referring to FIG. 1A to FIG. 4, the connecting member 3 extends along the Z-axis and connects the handle housing 1 and the motor housing 2 together, a first end of the connecting member 3 extends into the handle housing 1, a second end thereof extends into the motor housing 2, and the first end and the second end extend a certain length in the handle housing 1 and the motor housing 2, respectively, so that the contact length and area between the first end and the second end and the housings may be increased, thereby increasing the strength of connection of the connecting member 3 to the handle housing 1 and the motor housing 2. The connecting member 3 may be in the form of a connecting frame or a connecting tube, preferably a connecting tube, which is hollow in the interior and may be used for wiring, such as conductor lines such as power cables and signal wires, which can be connected between the handle housing 1 and the motor housing 2 through the interior space of the connecting tube to transmit power, control signals or data signals. The connecting tube may be cylindrical in shape or may have other shapes such as square tubes or other polygonal tubes as well as tubes in various regular and irregular shapes. The connecting tube may be made of a metal.

The connecting member 3 illustrated in the figures is a connecting tube, in particular a cylindrical tube, and, more specifically, an elongated cylindrical tube. The connecting member 3 may have a certain wall thickness or an increased wall thickness in order to increase the rigidity and strength of the connecting member itself and the strength of the connection with the housing. In order to facilitate the connection of the connecting member 3 to the housing, the inner walls of the handle housing 1 and the motor housing 2, respectively, have a shape adapted to the shape of an outer peripheral wall of the connecting member 3, e.g., the inner walls may be cylindrical or a frame, or the inner walls are provided with a plurality of arcuate ribs, and the overall combination of these ribs has a generally cylindrical shape. When the connecting member 3 is inserted into the housing upon assembling, the connecting member 3 has a form-fitting engagement with the housing. Furthermore, in order to increase the connection strength of the connecting member 3 with the housing, the connecting member 3 is provided at a first end with at least one first end hole 301 and at a second end with at least one second end hole 302, these end holes being through holes and being arranged transversely to an extension axis of the connecting member 3; the number of the end holes may be set according to actual application without particular limitation. The figures show two first end holes 301 and two second end holes 302, but this is only an example. Studs are respectively provided on the inner walls of the handle housing 1 and the motor housing 2, at positions corresponding to the first end holes 301 and the second end holes 302, and the studs are sized equivalent to the first end holes 301 and the second end holes 302, whereby the studs may be extended and inserted into the first end holes 301 and the second end holes 302.

By means of the form fitting of the inner wall of the housing with the outer wall of the connecting member 3 and the snap-fitting of the studs on the inner wall with the end holes, the connecting member 3 may be held securely in the housing. Then, fasteners may pass through the housings and studs so that a first end of the connecting member 3 is firmly clamped between the two housing halves of the handle housing 1 and a second end of the connecting member 3 is firmly clamped between the two housing halves of the motor housing 2, so that the connecting member 3 is firmly connected between the handle housing 1 and the motor housing 2.

In order to dampen vibrations transmitted from the motor housing 2 to the handle housing 1 via the connecting member 3, prevent loosening of the connection therebetween, and increase the strength of the connection therebetween, a vibration damping structure is provided. Specifically, the vibration damping structure comprises a plurality of vibration damping elements disposed between the connecting member 3 and the handle housing 1 and the motor housing 2, and further comprises vibration damping elements disposed between the connecting member 3 and the carrying handle 4, as described below. For example, a first vibration damping element 31 is provided between the first end of the connecting member 3 and the handle housing 1, and a second vibration damping element 32 is provided between the second end of the connecting member 3 and the motor housing 2. The vibration damping elements (comprising the third vibration damping element described below) may be made of a resilient material, such as rubber or other resilient material; furthermore, the vibration damping elements may also be embodied in the form of a soft glue or the like. Such materials may be collectively referred to as elastic. For this purpose, a certain clearance space may be left between the connecting member 3 and the inner wall of the handle housing 1 and the inner wall of the motor housing 2, and the vibration damping elements may be filled in the clearance space. On the one hand, the elasticity of the vibration damping elements may enable the vibration damping elements to deform freely to fill densely in the clearance space so as to closely adhere to the outer wall of the connecting member 3 and the inner wall of the housing, so that the contact area and the contact space between the connecting member 3 and the housing are increased, and furthermore, the connection of the connecting member 3 and the housing is firmer so as to minimize the connection loosening caused by the gap; on the other hand, upon operation of the tool, the vibration damping elements damp vibrations, greatly reduce damages caused by the vibrations to the components of the tool themselves and reduce the loosening of the connection between the components caused by the vibrations.

Figure 4:
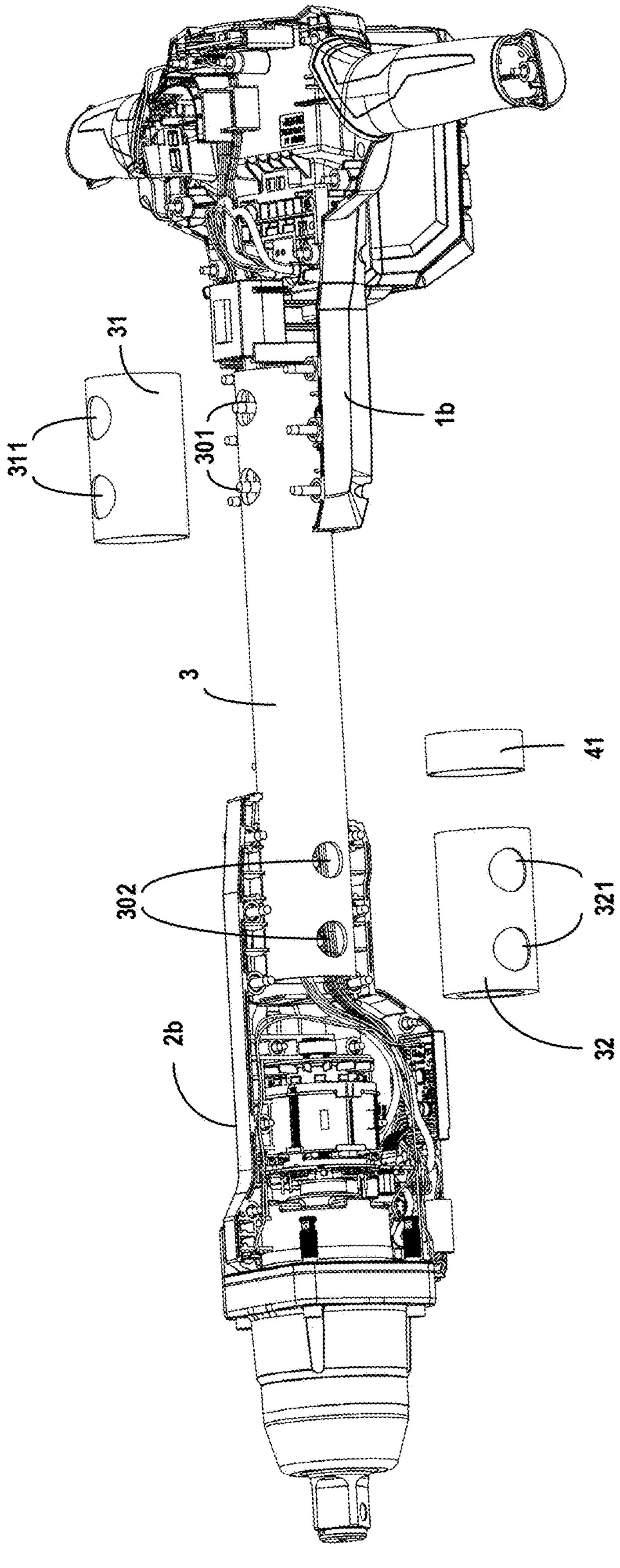
FIG. 4 is an exploded view of the damping structure.
Figure 5:
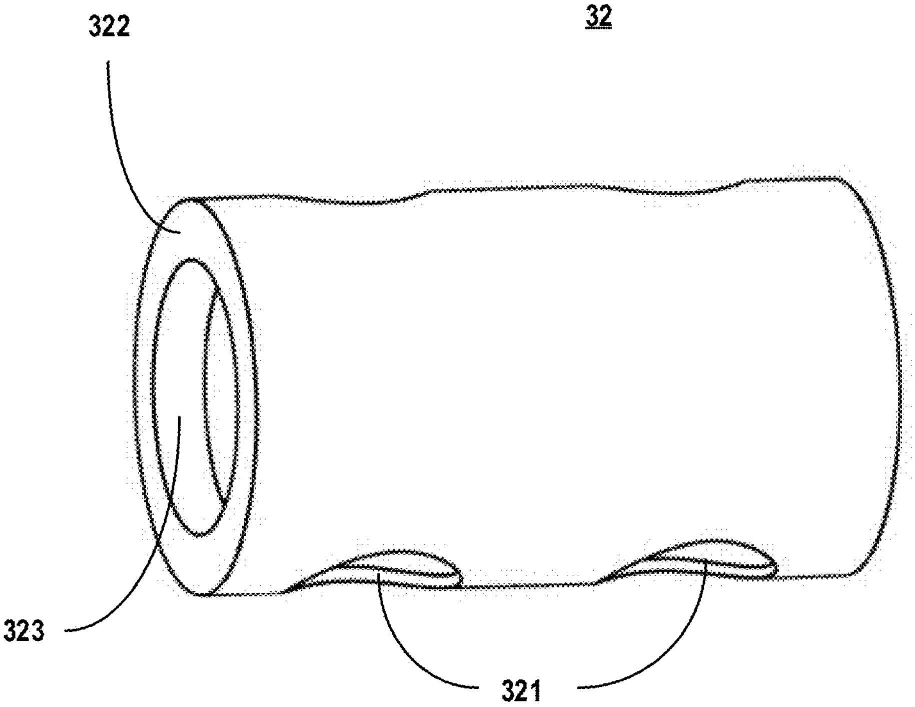
FIG. 5 is a perspective view of a second vibration damping element.
Figure 7:
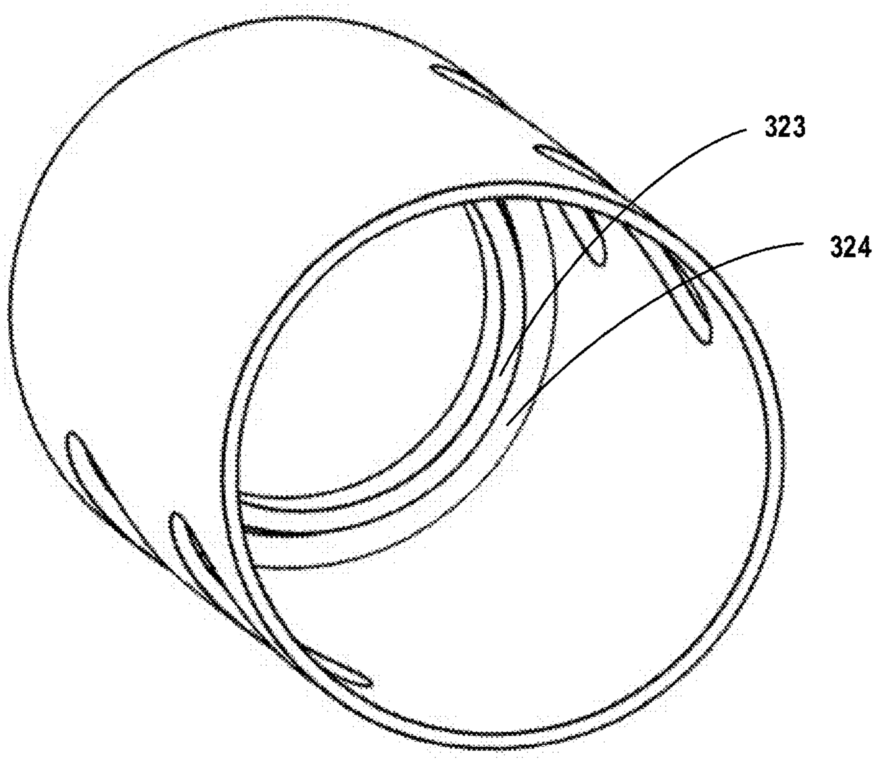
FIG. 7 is another perspective view of the second vibration damping element.

The first vibration damping element 31 and the second vibration damping element 32 are sleeved on the connecting member 3 so that their shapes are adapted to the shape of the connecting member 3. Specifically, the first vibration damping element 31 is sleeved on the first end of the connecting member 3 and the second vibration damping element 32 is sleeved on the second end of the connecting member 3; in addition, as described above, the connecting member 3 engages the handle housing 1 and motor housing 2 respectively in a form-fitting manner, so the first vibration damping element 31 and the second vibration damping element 32 also have shapes adapted to the handle housing 1 and the motor housing 2, respectively. Hereinafter, the circular tube-shaped connecting member 3 is also described as an example. With reference to FIG. 4 and FIG. 7, they show various views of the first vibration damping element 31 and the second vibration damping element 32, wherein the first vibration damping element 31 and the second vibration damping element 32 are identical in terms of construction and shape, so that only the second vibration damping element 32 will be described hereinafter and the description thereof is also applicable to the first vibration damping element 31.

The second vibration damping element 32 has an overall cylindrical shape, but is not limited thereto, and its shape may change correspondingly according to the shape of the connecting member 3 as described above. A length (i.e., a longitudinal dimension) of the second vibration damping element 32 may be the equal to the length of the second end of the connecting member 3 extending into the motor housing 2, i.e., the second vibration damping element 32 is completely located in the motor housing 2 with one end flush with the motor housing 2. Correspondingly, the second vibration damping element 32 has connecting holes 321 arranged corresponding to the second end holes 302, the connecting holes 321 are also through holes and arranged transversely to the extension axis of the second vibration damping element 32, and the number of the connecting holes 321 are equal to that of the second end holes 302. The figures show two connecting holes 321, which have the same positions and sizes as the second end holes 302. Through such an arrangement, when the connecting member 3 is coupled to the motor housing 2, the studs on the motor housing 2 are inserted through the connecting holes 321, the second end holes 302, and then the fasteners pass through the housing and the studs, thereby securely holding the motor housing 2, the second vibration damping element 32 and the connecting member 3 together.

Figure 6:
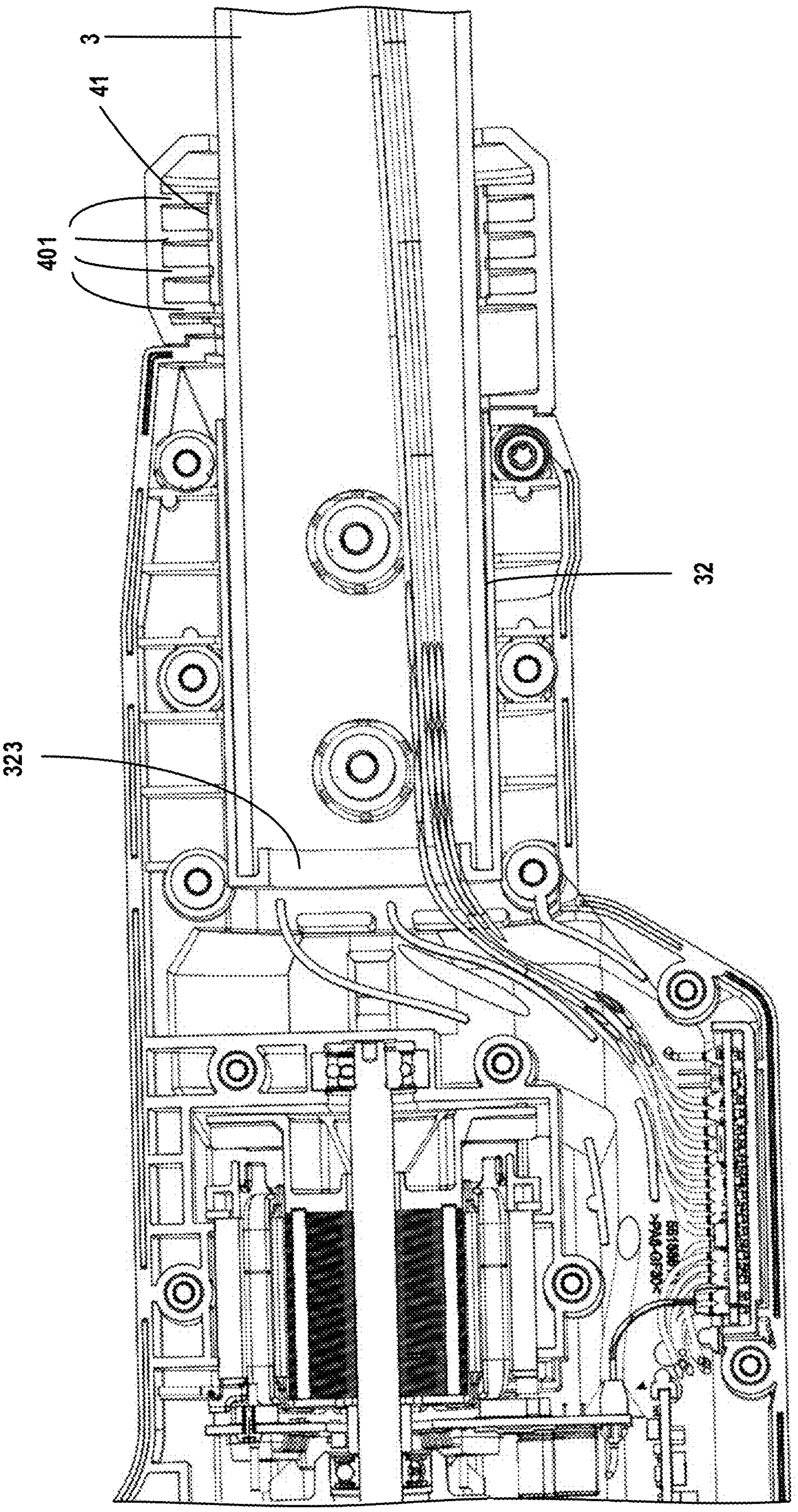
FIG. 6 is a cross-sectional view of the second vibration damping element in a mounted state.

Furthermore, one end of the second vibration damping element 32 is provided with a rim 322 extending radially inwards from an outer periphery of the second vibration damping element 32, the rim 322 being annular, i.e., an outer circumferential end of the rim 322 is connected to an outer circumferential edge of the second vibration damping element 32 (e.g., to form one piece), while an inner periphery thereof forms a hole for wiring, similar to the hollow interior of the connecting member 3. A circumferential protruding wall 323 extends from the inner periphery of the rim 322 in a direction of the length (i.e., the longitudinal dimension) of the second vibration damping element 32 towards the interior of the element 32, the circumferential protruding wall 323 is cylindrical in shape, a gap 324 is formed between its outer peripheral wall and the inner circumferential wall of the second vibration damping element 32, and the gap 324 is an annular space. Through such an arrangement, when the second vibration damping element 32 is sleeved on the connecting member 3, the second end of the connecting member 3 is inserted in the gap 324, whereby the rim 322 and the gap 324 may function to position to facilitate the mounting of the second vibration damping element 32, i.e., when the second end of the connecting member 3 is inserted and abuts against the gap 324 when the second vibration damping element 32 is sleeved on the connecting member 3, it may be determined that the mounting of the second vibration damping element 32 is completed, as shown in FIG. 6. In addition, the rim 322 and the circumferential protruding wall 323 may protect the cable in the connecting member 3, for example, the cable may be in contact with the clastic second vibration damping element 32 without being in contact with the second end of the connecting member 3, thereby preventing the sharp edge of the second end of the connecting member 3 from causing damages to the cable. Furthermore, when the cable is placed in the connecting member 3, even though the tool causes severe vibration during operation, the cable may only be in contact with the second vibration damping element 32 and the inner circumferential surface of the connecting member 3, so that the damages caused by the sharp edge to the cable can be prevented.

Figure 3:
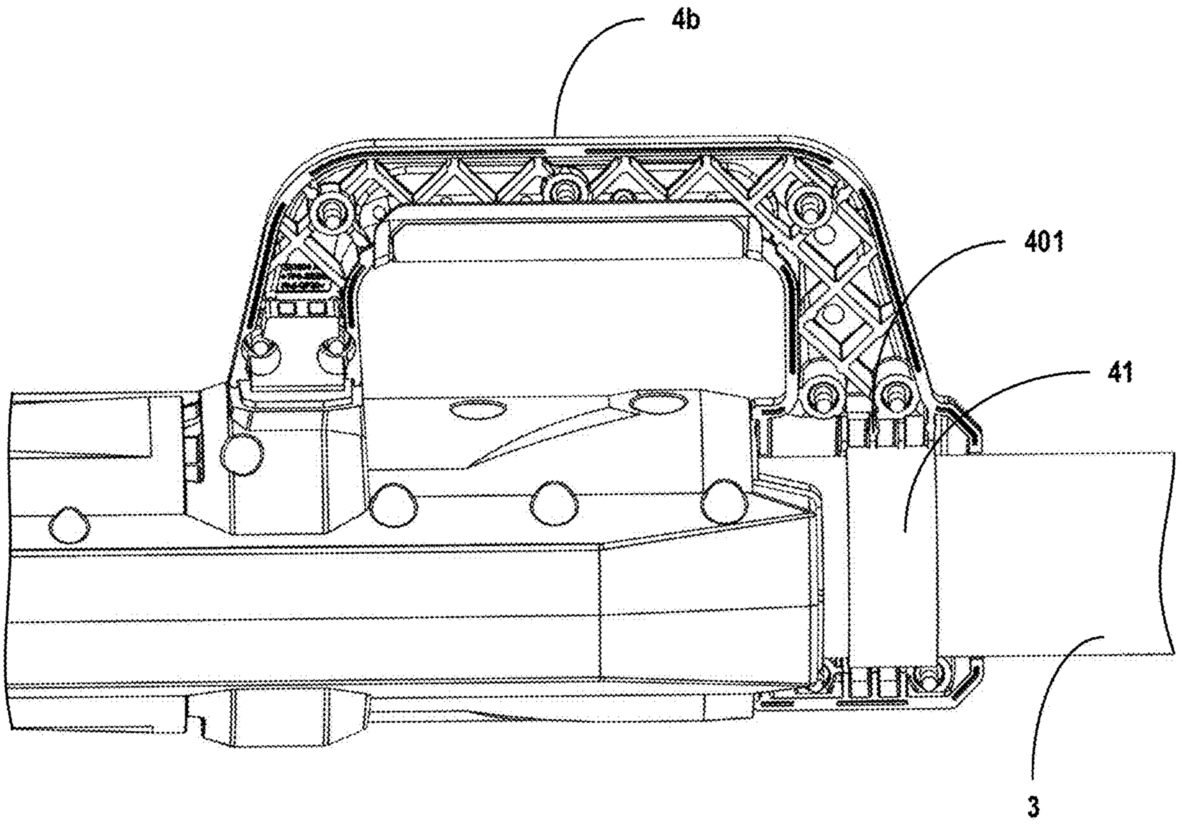
FIG. 3 is a detailed view of a carrying handle and a portion of a vibration dampening structure of an exemplary power tool according to the present disclosure.

In addition, the power tool 1 further comprises a carrying handle 4, also referred to as an assisting handle, which may be used to facilitate carrying when the tool is being transported, e.g., an operator may hold the carrying handle to carry the power tool from one location to another; as another example, when the power tool is operated, the power tool is operated in a vertical orientation, and the operator may hold the carrying handle 4 to assist the power tool in operation. As shown, a first end of the carrying handle is disposed on the connecting member 3 and a second end thereof is disposed on the motor housing, i.e., the carrying handle is disposed at both ends of the second vibration damping element 32. In an alternative embodiment, both ends of the carrying handle are connected to the connecting member 3 and located between the handle housing 1 and the motor housing 2. Similar to the handle housing and the motor housing, the carrying handle 4 may also be divided into two halves, comprising a first carrying handle half **4*a* and a second carrying handle half 4*b*. The two carrying handle halves are fastened to each other by fasteners, such as bolts. Referring to FIG. 3, the first end of the carrying handle is divided into two halves, each half has a semi-circular cross-section, the two halves, when assembled together, form a circular cross-section adapted to the shape of the circular connecting member 3 so that the first end of the carrying handle is clamped at the periphery of the circular connecting member 3. Similarly, the second end of the carrying handle is connected to the motor housing 2**, and a projection is provided at a corresponding connection position on the motor housing. The second end of the carrying handle is divided into two halves, each half has an internal profile conforming to the projection, such that the two halves snap over the projection when assembled and are fastened together by fasteners.

Similarly, in order to damp vibrations between the carrying handle 4 and the connecting member 3, to prevent loosening of the connection therebetween and to increase the strength of the connection therebetween, a third vibration damping element 41 is provided which, like the first vibration damping element and the second vibration damping element, is adapted to the shape of the carrying handle and the connecting member. The third vibration damping element 41 is, for example, annular, sleeved on the connecting member 3, and disposed at the first end of the carrying handle, between the carrying handle and the connecting member. In order to enhance the connection between the carrying handle, the third vibration damping element and the connecting member, the inner wall of the first end of the carrying handle is provided with a plurality of ribs 401. The combination of the ribs has a shape adapted to the shape of the connecting member 3, for example a generally cylindrical shape, so that the ribs 401 press the third vibration damping element against the connecting member 3 when the carrying handle is connected to the connecting member. Similar to the first vibration damping element and the second vibration damping element described above, the third vibration damping element makes the connection of the connecting member 3 to the carrying handle firmer and minimizes the loosening of the connection between the two; on the other hand, the third vibration damping element dampens the vibrations during operation of the tool, greatly reduces the damages caused by the vibrations to the carrying handle itself, and reduces the loosening of the connection between the carrying handle and the connecting member due to the vibrations.

Figure 8:
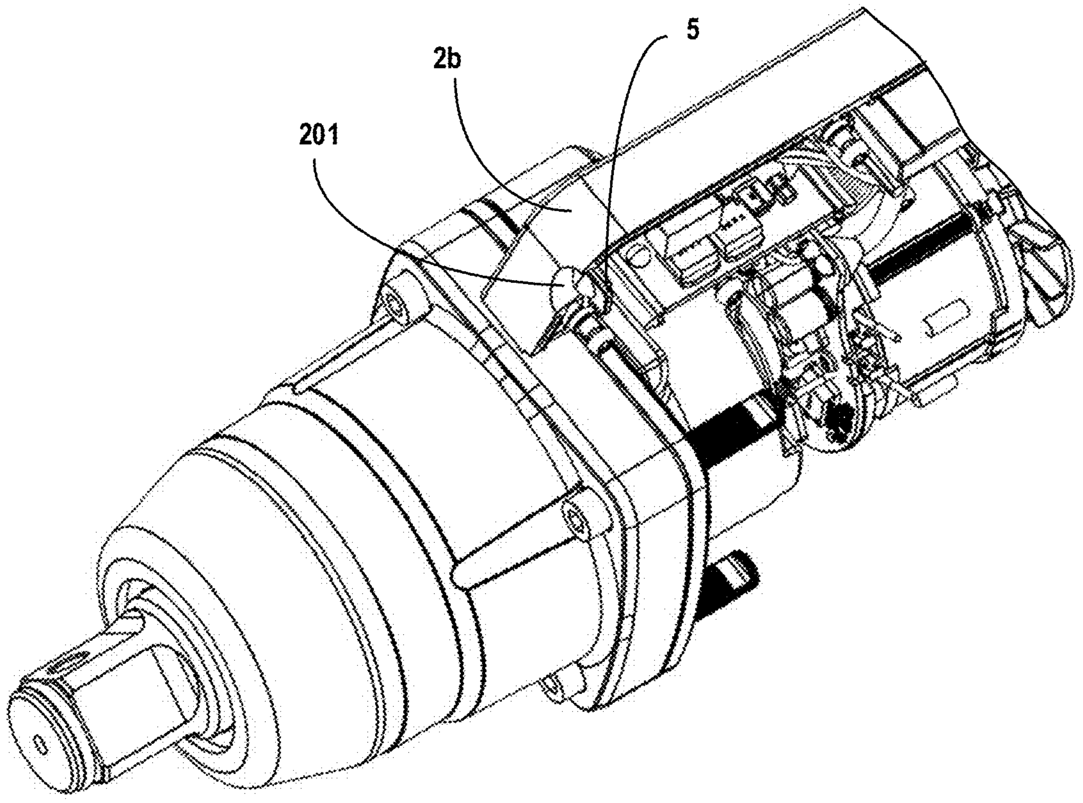
FIG. 8 is a perspective view showing that a lighting device is mounted on the motor housing.

In addition, with reference to FIG. 8, at least one lighting device 5, such as an LED, is disposed at a front end of the working portion to enable the operator to clearly see the surrounding and operation situations of the working element when the power tool operates (such as the light is dark or at night). Specifically, at least one lighting device 5 is disposed at a lower end of the motor housing 2, close to the gearbox. The lighting device 5 may illuminate the surrounding of the working element. The lighting device 5 may be disposed between the two motor housing halves **2*a* and 2*b* of the motor housing 2. Specifically, each of the motor housing halves 2*a* and 2*b* is provided with two recesses 201 at one end near the gearbox, the two recesses 201 are symmetrical with respect to the Z axis, i.e., the two motor housing halves 2*a* and 2*b* totally have four recesses 201. FIG. 8 only shows one of the recesses 201. When the two motor housing halves 2*a* and 2*b* are assembled into the motor housing 2, the respective two recesses 201 are combined into one groove, so that the four recesses 201 together form two grooves which are symmetrical with respect to the Z axis. One lighting device 5 is disposed in each groove, and a total of two lighting devices 5 are disposed in an interface between the two motor housing halves 2*a* and 2*b*, i.e., disposed in the recesses 201 at the front end of the working portion. The two lighting devices 5 are disposed in front of and behind the gearbox so that when the power tool operates, the working element and the surrounding working region can be illuminated from front and rear. The two lighting devices 5** share a switch with the motor. When the switch is turned on, the LED is turned on; when the switch is turned off, the LED remains on for a predetermined time period (e.g., 9 seconds) and then goes out, thereby leaving a buffer time for the extinguishing of the LED so that the operator may perform further processing for the power tool in this time period.

The depictions of the shape, arrangement positions, arrangement orientations and number and material composition of the vibration damping elements in the present disclosure are merely examples and are not limiting and are not only limited to arranging the vibration damping elements between the handle housing, the motor housing and the carrying handle and the connecting member. Instead, the vibration damping elements may be arranged correspondingly at different positions according to the type, size, structure and vibration damping and buffering requirements of the power tool, as long as the vibration-damping and buffering effects may be achieved in the power tool and between different components, which all falls within the concept and protection scope of the present disclosure.

According to the power tool of the present disclosure, by providing the vibration damping elements between the handle housing, the motor housing and the carrying handle and the connecting member of the power tool, the connection strength between them may be increased, the vibration may be dampened, the damages caused by the vibration to the components of the power tool itself may be greatly reduced, and the loosening of the connection between the components caused by the vibration may be reduced.

Although specific embodiments of the present disclosure have been described above, those skilled in the art will understand that these are only examples and that the scope of the present disclosure is defined by the appended claims. Those skilled in the art would have been able to make various combinations, changes, or modifications to these embodiments without departing from the principles and spirit of the present disclosure, but these combinations, changes and modifications all fall within the scope of the present disclosure.

Various features of the disclosure are set forth in the following claims. When used in this specification and claims, the terms "comprises" and "comprising" and variations thereof mean that the specified features, steps, or integers are included. The terms are not to be interpreted to exclude the presence of other features, steps, or components.

What is claimed is:

1. A power tool comprising:

a working portion including a motor housing enclosing a motor;

a handle portion including a handle housing, two gripping portions extending in opposite directions such that the handle portion is generally T-shaped, and a battery receptacle;

a connecting member having a first end coupled to the handle housing and a second end coupled to the motor housing; and a vibration damping structure configured to reduce transmission of vibration from the motor housing to the handle housing, wherein the first end of the connecting member extends into the handle housing, and wherein the second end of the connecting member extends into the motor housing.

2. The power tool of claim 1, wherein the vibration damping structure includes a first vibration damping element disposed between the first end of the connecting member and the handle housing, and a second vibration damping element disposed between the second end of the connecting member and the motor housing.

3. The power tool of claim 2, wherein the second vibration damping element has the same shape as the first vibration damping element.

4. The power tool of claim 3, wherein the first vibration damping element and the second vibration damping element are cylindrical.

5. The power tool of claim 2, wherein the first end of the connecting member includes a first through hole, wherein the second end of the connecting member includes a second through hole, wherein the first through hole receives a first fastener to couple the first end of the connecting member to the handle housing, and wherein the second through hole receives a second fastener to couple the second end of the connecting member to the motor housing.

6. The power tool of claim 5, wherein the second vibration damping element includes a connecting through hole aligned with the second through hole.

7. The power tool claim 2, wherein one end of the second vibration damping element is provided with an annular rim extending radially inwards from an outer circumference of the second vibration damping element.

8. The power tool of claim 7, wherein the one end of the second vibration damping element is provided with a circumferential protruding wall extending from an inner circumference of the annular rim in a length direction of the second vibration damping element toward an interior of the second vibration damping element, and wherein an annular space is formed between the circumferential protruding wall and an inner circumferential wall of the second vibration damping element, and wherein the second end of the connecting member is inserted into the annular space.

9. The power tool of claim 2, wherein the power tool further comprises a carrying handle coupled to the connecting member and located between the handle housing and the motor housing.

10. The power tool of claim 9, further comprising a third vibration damping element provided between an end of the carrying handle and the connecting member.

11. The power tool of claim 10, wherein the first vibration damping element, the second vibration damping element, and the third vibration damping element are made of an elastic material.

12. The power tool of claim 1, further comprising a lighting device is disposed in a recess at a front end of the working portion.

13. The power tool of claim 1, wherein the working portion includes a drive assembly comprising a camshaft configured to receive torque from the motor, an anvil, and a hammer is movable along the camshaft to deliver periodic rotational impacts to the anvil.

14. The power tool of claim 1, wherein the battery receptacle is disposed on a side of the handle housing and configured to receive a battery pack such that the battery pack is offset from a central longitudinal axis of the power tool.

15. A power tool comprising:

a working portion including a motor housing enclosing a motor, a gearbox coupled to the motor housing, and a drive assembly including an anvil extending from the gearbox;

a handle portion including a handle housing, two gripping portions extending in opposite directions such that the handle portion is generally T-shaped, and a battery receptacle disposed on a side of the handle housing;

an elongated connecting member extending along a central longitudinal axis and having a first end coupled to the handle housing and a second end coupled to the motor housing; and a battery pack slidably coupled to the battery receptacle along a battery axis parallel to the central longitudinal axis.

16. The power tool of claim 15, further comprising first vibration damping element provided between the handle housing and the first end of the elongated connecting member and a second vibration damping element provided between the motor housing and the second end of the elongated connecting member.

17. A power tool comprising:

a working portion including a motor housing enclosing a motor, a gearbox coupled to the motor housing, and a drive assembly including an anvil extending from the gearbox;

a handle portion including a handle housing, two gripping portions extending in opposite directions such that the handle portion is generally T-shaped, and a battery receptacle disposed on a side of the handle housing;

a connecting member having a first end coupled to the handle housing and a second end coupled to the motor housing; and a vibration damping structure configured to reduce transmission of vibration from the working portion to the handle portion.

18. The power tool of claim 17, wherein the vibration damping structure includes a plurality of elastic vibration damping elements.

19. The power tool of claim 17, further comprising a battery pack removably coupled to the handle portion.

* * * * *